Patented Apr. 13, 1926.

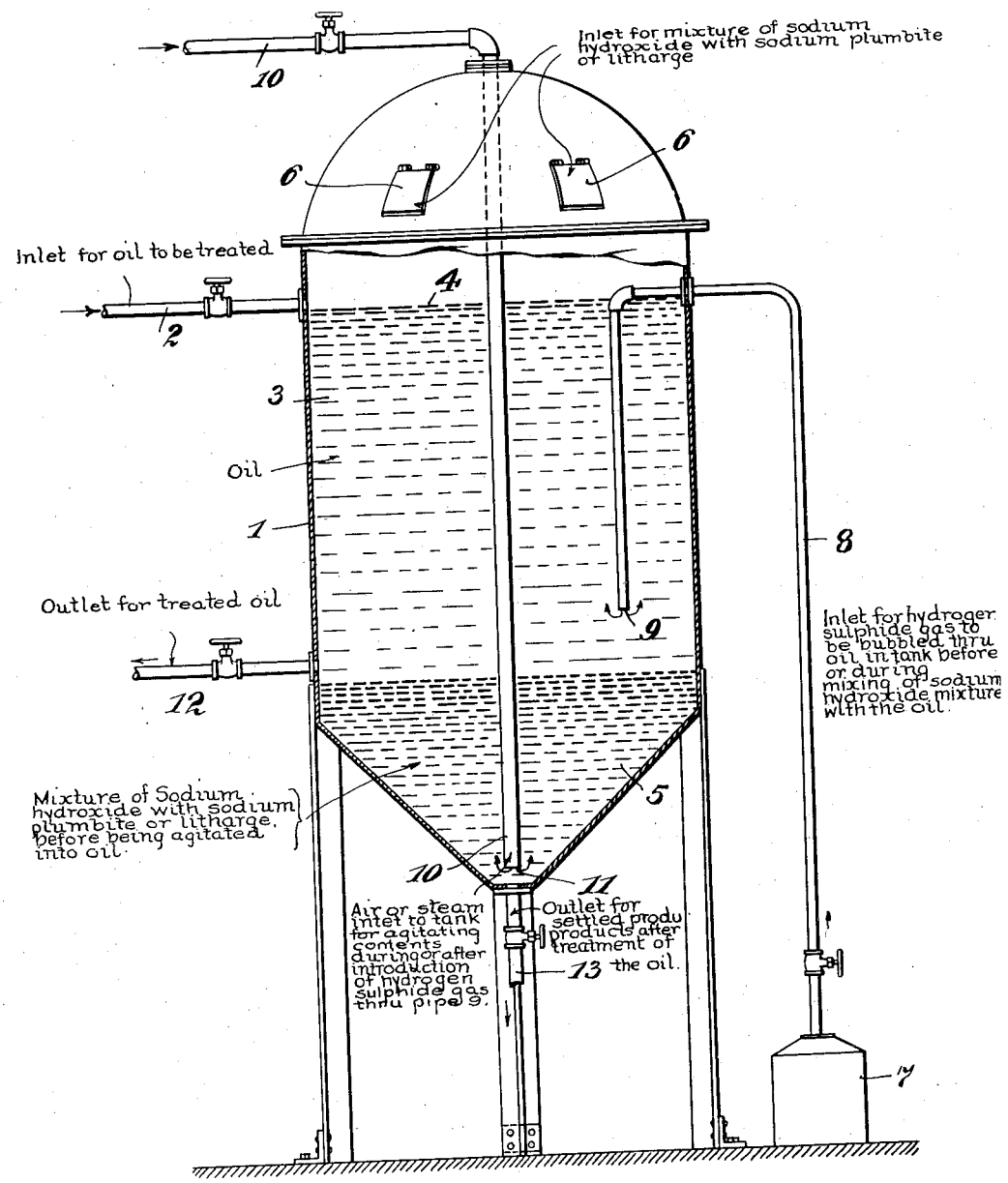

1,580,531

UNITED STATES PATENT OFFICE.

JAMES B. RATHER, OF BROOKLYN, NEW YORK, ASSIGNOR TO STANDARD OIL COMPANY OF NEW YORK, OF NEW YORK, N. Y., A CORPORATION OF NEW YORK.

PROCESS OF DESULPHURIZING PETROLEUM OILS.

Application filed May 9, 1923. Serial No. 637,625.

*To all whom it may concern:*

Be it known that I, JAMES B. RATHER, a citizen of the United States, residing in the borough of Brooklyn, county of Kings, city and State of New York, have invented certain new and useful Improvements in Processes of Desulphurizing Petroleum Oils, of which the following is a specification.

This invention relates to a process of desulphurizing petroleum oils, and more particularly relates to a gas sweetening process for naphthas, gasolines and kerosenes.

The usual processes of sweetening naphthas, gasolines, kerosenes, and the like, involve the use of sulphur which remains in the oil after the treatment and renders the oil corrosive to copper and other metals. To render the product non-corrosive, it is usually put in a still and re-run with steam, but this treatment frequently impairs the odor of the product to a very great extent, and often so much that the product cannot be classified as "sweet." To again restore sweetness to the product, previous processes required additional chemical treatment.

The principal aim of my invention is to provide a process of producing from petroleum oil products which are free from objectionable odor and (or) which are non-corrosive to metals. Another object is to provide a process of the above character which may be carried out quickly and economically and without re-running or re-distilling the materials, but which, if desired, may be efficiently practiced also after re-running, and either in connection with, or without, the previous use of sulphuric acid. Other objects of my invention will be in part obvious and in part pointed out hereinafter.

The invention accordingly consists in the several steps and the relation to each of the others thereof which will be exemplified in the hereinafter disclosed process, and the scope of the application of which will be indicated in the claims that follow.

I have discovered that when lead sulphide is produced by chemical reaction in petroleum oil containing sulphur compounds which give objectionable odor to the oil, without employing sulphur, the lead sulphide and the odor-giving sulphur compounds will settle together in a segregated mass, and will leave the remaining oil free of objectionable odor. If the treated oil was non-corrosive to metals, it will remain so. The reaction in the oil to produce the lead sulphide may be accomplished in many ways. Preferably, I produce such reaction by adding to the oil to be treated, as separate elements, hydrogen sulphide gas and an element comprising a mixture of sodium hydroxide and a chemical including lead, such as sodium plumbite or litharge. These elements may be incorporated in the oil in many ways, so long as the hydrogen sulphide gas does not react with the sodium hydroxide mixture before being incorporated in the oil. For instance, the hydrogen sulphide gas may first be dissolved in the oil and then the sodium hydroxide mixture added thereto, or the sodium hydroxide mixture may be placed as a layer at the bottom of the oil to be treated and then the hydrogen sulphide gas bubbled through the oil layer but not through the sodium hydroxide mixture layer. Preferably the oil and the added elements are agitated together by any suitable means, either mechanical or pneumatic, until the desired chemical reaction in the oil has been obtained. Then the mixture is allowed to stand until the lead sulphide and the sulphur compounds which are intended to be removed have settled out of the oil, whereupon the clear oil may be drawn off.

In order that a clearer understanding of my invention may be had, attention is hereby directed to the accompanying drawing, forming a part of this application and illustrating diagrammatically an apparatus adapted for use in practicing the process of the invention.

Referring to the drawing, the process may be carried out by means of a wash tank of the usual type, comprising a tank or receptacle 1, having an inlet pipe 2 through which petroleum oil to be treated may be introduced into the tank. In one manner of practicing the process, petroleum oil 3, to be treated is introduced into the tank through pipe 2 until the tank is filled to the desired level, for instance, to the level indicated by the line 4, and then a mixture 5 of sodium hydroxide with sodium plumbite or litharge is introduced into the tank, as by delivering the mixture through explosion doors 6. This mixture settles at the bottom of the tank and will normally remain as a layer below the oil. Hydrogen sulphide gas, derived from any suitable source, such as tank or cylinder 7, is then introduced into the tank, as through pipe 8, and is caused to bubble up into the petroleum oil in the tank so as to be dissolved therein without coming in contact with the layer of sodium hydroxide material 5, the discharge end 9 of this pipe 8 being purposely disposed above this layer 5. The hydrogen sulphide gas is fed into the petroleum oil until a considerable quantity of the gas has become dissolved in the oil, the time required for this treatment depending upon the quantity of oil in the tank and on the volume of gas introduced per unit of time. In ordinary practice a period of ten to fifteen minutes will suffice for this step of the process. The supply of hydrogen sulphide gas may now be cut off or may be continued, as desired, and the contents of the tank are thoroughly mixed together, as by any suitable means of agitation. To accomplish this agitation a pipe 10 may be led into the tank with its discharge opening 11 close to its bottom, and air or steam may be introduced into the tank through this pipe to agitate the contents. The intermingling of the contents of the tank results in chemical reactions producing lead sulphide. It will be noticed that sulphur is not added to the contents. After such reaction has proceeded approximately to its limit, the agitation of the contents of the tank is stopped and the mixture therein is allowed to settle. The products settling out will be found to comprise lead sulphide produced in the oil, together with the sulphur compounds which it is desired to remove from the oil, these having drawn together during and in consequence of the reaction forming globules which settle out of the oil. When the settlement is complete, the remaining oil may be drawn off, as through outlet pipe 12, and will be found to be free of objectionable odor and to have its non-corrosive characteristics unimpaired. The settled products remaining in the tank may then be drawn or washed out through outlet pipe 13, or they may be removed in any desired way.

It is to be understood that the process can be carried out in many other ways than the one specifically described above. For instance, the hydrogen sulphide gas may be dissolved in the oil before the addition of the sodium hydroxide mixture to the tank, and subsequently agitating with air or other means, or the agitation may be carried out during the addition of the hydrogen sulphide gas.

The petroleum oil may be treated either with or without the usual pretreatment with sulphuric acid, and either with or without previous re-running to remove free sulphur. However, if practiced on oil which is corrosive, the resultant product will be sweetened, and will remain corrosive, but the corrosiveness will not be increased.

As many changes could be made in carrying out the above process without departing from the scope of the invention, it is intended that all matter contained in the above description shall be interpreted as illustrative and not in a limiting sense.

What I claim is:—

1. The process of treating petroleum oils, which includes, dissolving hydrogen sulphide gas in the oil, and combining the oil containing said dissolved gas with a mixture of sodium hydroxide and litharge (or sodium plumbite) to produce lead sulphide suspended in the oil, the lead sulphide serving to promote reaction between sulphurous elements in the oil and the plumbite solution in such manner that the oil so treated is sweet to the "doctor" and non-corrosive in character.

2. The process of treating petroleum oils, which includes, dissolving hydrogen sulphide gas in the oil by passing the gas into the oil, and combining the oil containing said dissolved gas with a mixture of sodium hydroxide and litharge (or sodium plumbite) to produce lead sulphide suspended in the oil, the lead sulphide serving to promote reaction between sulphurous elements in the oil and the plumbite solution in such manner that the oil so treated is sweet to the "doctor" and non-corrosive in character.

3. The process of treating petroleum oils, which includes, intermingling in the oil a mixture of sodium hydroxide and litharge (or sodium plumbite) in the presence of hydrogen sulphide gas to produce lead sulphide suspended in the oil, the lead sulphide serving to promote reaction between sulphurous elements in the oil and the plumbite solution in such manner that the oil so treated is sweet to the "doctor" and non-corrosive in character.

4. The process of treating petroleum oils, which includes, intermingling in the oil a mixture of sodium hydroxide and litharge (or sodium plumbite) in the presence of hydrogen sulphide gas to produce lead sulphide suspended in the oil, the lead sulphide serving to promote reaction between sulphurous elements in the oil and the plumbite solution in such manner that the oil so treated is sweet to the "doctor" and non-corrosive in character, ceasing the agitation, allowing the substances which render the oil corrosive in character and not sweet to the "doctor" to settle, and removing the desulphurized and sweetened oil from the settled substances.

5. The process of deodorizing petroleum oils containing odor-giving sulphur elements, which includes introducing a mixture of sodium hydroxide and sodium plumbite or litharge into a quantity of oil to be treated and allowing the mixture to settle, bubbling hydrogen sulphide gas through the oil above said settled mixture until a considerable quantity of said gas has been dissolved in the oil, discontinuing the flow of gas, and thoroughly mixing the oil containing the dissolved gas and said settled mixture together, to produce lead sulphide suspended in the oil, the lead sulphide serving to promote reaction between sulphurous elements in the oil and the plumbite solution in such manner that the oil so treated is sweet to the "doctor" and non-corrosive in character.

This specification signed this 4th day of May, 1923.

JAMES B. RATHER.